(12) United States Patent
Cranford, Jr. et al.

(10) Patent No.: US 6,332,166 B1
(45) Date of Patent: Dec. 18, 2001

(54) ADAPTIVE INTERFACE APPARATUS AND METHOD FOR DATA TERMINAL ELEMENTS IN A COMMUNICATION NETWORK TRANSMITTING AND RECEIVING ETHERNET OVER A SHIELDED TWISTED PAIR CABLING SYSTEM

(75) Inventors: Hayden Clavie Cranford, Jr., Apex; Joseph Ronald Efferson, Jr., Raleigh; Theodore Allen Gary, Apex; Steven Howard Johnson, Cary; Gregg Kreielsheimer, Raleigh; Mark Edmund Scheuer, Wake Forest, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,480

(22) Filed: Dec. 15, 1999

Related U.S. Application Data
(60) Provisional application No. 60/112,483, filed on Dec. 16, 1998.

(51) Int. Cl.$^7$ ..................................................... G06F 15/16
(52) U.S. Cl. ............................................................ 709/250
(58) Field of Search ............................... 333/25; 370/401; 439/620; 709/250

(56) References Cited

U.S. PATENT DOCUMENTS

| | | | |
|---|---|---|---|
| 4,516,122 | * | 5/1985 | Tomikawa ........................... 340/825.5 |
| 4,766,402 | * | 8/1988 | Crane ...................................... 333/25 |
| 5,249,183 | | 9/1993 | Wong et al. .......................... 370/228 |

(List continued on next page.)

*Primary Examiner*—David Y. Eng
(74) *Attorney, Agent, or Firm*—Morgan & Finnegan, LLP (57) ABSTRACT

An adaptive interface and method of operation facilitate connection of a work station in a Local Area Network (LAN) using Shielded Twisted Pair (STP) cabling to an Ethernet 10/100BASE TX installation using Unshielded Twisted Pair (UTP). The work station is coupled through the adaptive interface to the STP cabling system emulating a given number of meters of UTP cabling. The interface adapter comprises at one end a RJ 45 connector adapted for connection to the STP cabling and at the other end a MIC_S token ring connector coupled to an Ethernet adapter through the STP cabling system. The adaptive interface includes programmatically controlled filters interconnecting the RJ 45 and MIC_S connectors. The filter comprises a series of 1 . . . N switchable lumped passive element units which can be sequentially connected into the STP cabling to emulate the amplitude attenuation and phase shift of a preselected length of UTP 5 cabling, typically in the range of 20 meters. In operation, the Physical Layer (PHY) in the communication system enters a start up sequence for the various circuits and cabling in the layer. During the start up sequence, the adaptive interface is bypassed. After an appropriate delay to allow PHY convergence or a bit error rate measurement, the PHY transmit/receive signals are examined for bit errors by a test unit. If there are no bit errors, no filter element is inserted in the STP cabling by the adaptive interface and the work station is coupled to the Ethernet installation. If there are bit errors, a first filter element is switched into the STP cabling by the adaptive interface. The bit error signals are re-examined. If there are no errors, the workstation is connected to the Ethernet installation. If bit errors continue to exist, the next element(s) of the filter is inserted into the STP cabling until the "Nth" filter element is reached. If bit errors continue to exist on the STP cabling after inserting the Nth filter in the STP cabling, a re-try test sequence is initiated by the adaptive interface and the start up sequence is repeated. If re-try is not initiated, a transmit error is displayed and the workstation/Ethernet installation cannot proceed without modification. A diagnostics menu is displayed and a set-up process determines with human intervention what system changes are needed for the workstation/Ethernet connection.

17 Claims, 5 Drawing Sheets

U.S. PATENT DOCUMENTS

| | | | | |
|---|---|---|---|---|
| 5,255,267 | * | 10/1993 | Hansen et al. | 370/401 |
| 5,497,460 | | 3/1996 | Bailey et al. | 714/39 |
| 5,587,884 | * | 12/1996 | Raman | 361/728 |
| 5,647,767 | * | 7/1997 | Scheer et al. | 439/620 |
| 5,739,707 | * | 4/1998 | Barraclough . | |
| 6,125,415 | * | 9/2000 | Liu | 711/106 |
| 6,154,784 | * | 11/2000 | Liu | 709/250 |
| 6,171,152 | * | 1/2001 | Kunz | 439/620 |

* cited by examiner

| FIG. 4A |
|---|
| FIG. 4B |

ADAPTIVE INTERFACE APPARATUS AND METHOD FOR DATA TERMINAL ELEMENTS IN A COMMUNICATION NETWORK TRANSMITTING AND RECEIVING ETHERNET OVER A SHIELDED TWISTED PAIR CABLING SYSTEM

This application claims the benefit of the filing date of Provisional Application Serial No. 60/112,483, filed Dec. 16, 1998, assigned to the assignee of the present invention and fully incorporated herein by reference.

BACKGROUND OF THE INVENTION

1. Field of Invention:

This invention relates to interface apparatus and methods of operation in communication networks. More particularly, the invention relates to adaptive interface apparatus and methods for data terminal elements transmitting and receiving Ethernet over a shielded twisted pair cabling system.

2. Description of Prior Art:

Many customers have installed Shielded Twisted Pair (STP) cabling systems. The systems have specific characteristics based on a 150 ohm STP wire with hermaphroditic data connectors, and a standard RJ 45 telephone connector with a unique pin out. The system further includes a large data connectors installed at an office wall connector and has the RJ 45 telephone connector in a wiring closet. Workstations in these offices typically have token ring adapters with cables that attach them from the workstation adapter to the telephone connector in the office wall connector and wiring closet.

Ethernet installations include 10/100BASE T Ethernet adapters, which provides dual speed connection to the Ethernet at 10 Mbps or 100 Mbps. The 10/100BASE T Ethernet adapters use RJ 45 standard telephone connectors throughout the network. However, the telephone connector pin out is different than that used for token ring. Also, the Ethernet adapter uses Unshielded Twisted Pair (UTP) 100-ohm cabling.

Token ring customers using STP cabling systems may wish the option to connect to Ethernet installation and to do so presents several problems. First, the pin out of the standard RJ 45 telephone connectors in the STP cabling system is different than the pin out of an Ethernet telephone connector. Second, there is a difference in the characteristic impedance used by the STP cabling system (150 ohm) and a typical Ethernet installation (100-ohm). Third testing or replacing the cabling system will, in most cases, eliminate any potential cost savings in using Ethernet. Fourth, many Ethernet transceivers have adaptive equalization algorithms, which are designed assuming that the transmission media is Unshielded Twisted Pair (UTP) Category 5 cable. STP cabling systems have less attenuation and phase shift than the UTP Category 5 cable for a given length. Some commercial transceivers are known to be optimized around the midlength cable (20 meters 80 meters). The Ethernet algorithms which change both equalizer and attenuation settings in these transceivers are designed assuming that the transceiver will be used in a cabling system using up to 100 meters of UTP Category 5 cable. While many transceivers may function with type 1 STP cabling, it would be advantageous to have the capability of inserting a filter which emulates a given number of meters of UTP 5 cable for those transceivers which optimize around the 100 meter design point.

What is needed in the communication industry is an adaptive interface, which makes the STP cabling system easily usable for Ethernet installations and satisfies all Ethernet requirements.

Prior art related to interface apparatus and networks includes the following:

U.S. Pat. No. 5,497,460 to W. D. Bailey et al., issued Mar. 5, 1996 (Bailey), discloses a multiprotocol LAN adapter for use in a workstation to determine the type of network to which the workstation is connected to through a port and automatically determine the type of physical medium to which the workstation is attached. Connected to each port are various network interfaces for supporting various available networking protocols, e.g., token ring, Ethernet, etc. Logic circuitry and control software are connected to the network interface device. To determine the network connection to the port, a short interrogation frame is successively transmitted by each of the networking interface devices to each of the ports. Depending upon the status of each transmission, the adapter determines what type of network, if any is connected to by which type of physical media. Based upon these two determinations, the workstation can be automatically configured without user intervention.

U.S. Pat. No. 5,249,183 to D. Wong et al., issued Sep. 28, 1993 (Wong), discloses a local area network (LAN) having a 10 BASE-T media attachment unit (MAU) coupling an attachment unit interface (AUI) to a twisted pair link through an AUI port of the 10 BASE-T MAU. The MAU provides an interface between the AUI and a RJ 45 twisted pair telephone connector which auto engages which activity is detected on the twisted pair link. Lack of activity on the twisted pair link forces the 10 BASE-T MAU to isolate its AUI port from the AUI. An Ethernet (coaxial) type MAU commonly connected with the 10 BASE-T MAU at the AUI may be utilized without manual intervention when the twisted pair link is inactive.

None of the prior art discloses interface apparatus with specific pin-to-pin transformation from the RJ 45 side to the STP connector side; impedance transformation and a lumped element passive filter which emulates the amplitude attenuation and phase effect of a given number of meters of UTP Category 5 cable.

SUMMARY OF INVENTION

An object of the invention is an adaptive interface apparatus and methods of operation for coupling token ring data terminal elements to Ethernet installations.

Another object is an adaptive interface apparatus and methods of operation for transmitting and receiving Ethernet over a STP cabling system.

Another object is an adaptive interface apparatus and methods of operation, which emulates the amplitude and attenuation and phase effects of a given number of meters of UTP Category 5 cable incorporated in an Ethernet installation.

Another object is an adaptive interface apparatus and method of operation for automatically connecting a filter into a STP cabling system for transmitting and receiving to/from an Ethernet installation.

Another object is a filter, which automatically adjusts the impedance, phase and attenuation for connecting an STP cabling system to an Ethernet installation. These and other objects, features and advantages are achieved in a communications system using Open System Interface (OSI) architecture and including an adaptive interface apparatus and a method of operation to facilitate connection of a workstation in a local area network (LAN) using STP cabling to an Ethernet 10/100BASE TX installation. The workstation is coupled through the adaptive interface apparatus to a Shielded Twisted Pair (STP) cabling system emulating a given number of meters of Unshielded Twisted Pair (UTP) cabling system. The adaptive interface apparatus comprises at one end a RJ 45 telephone connector adapted and suitable for UTP cabling and at the other end a STP Medium Interface (MIC_S) connected to and transitioning to the STP cabling systems. Included in the adaptive interface are a series of 1 . . . N switchable lumped passive elements which can be sequentially connected into the STP cabling system to emulate the amplitude attenuation and phase shift of a preselected length of UTP 5 cabling. In operation, the Physical Layer (PHY) in the communication system enters a start up sequence for various circuits and cabling in the layer. During start up, the adaptive filter is bypassed. After an appropriate delay to allow the PHY conversions or a bit/error rate measurement, the adaptive filter is programmatically controlled to allow the PHY transmit/receiver signals to be examined for bit errors by a test unit. If there are no test bit errors, no filter elements are inserted into the STP cabling by the adaptive interface and the workstation is coupled to the Ethernet. If there are bit errors, a first filter element is programmatically switched into the STP cabling by the adaptive interface. The bit error signals are reexamined. If there are no errors, the workstation is connected to the Ethernet. If bit errors continue to exist, the next element (s) of the filters are programmatically inserted into the STP cabling until the Nth filter element is reached. If bit errors continue to exist on the STP cabling after inserting the Nth element in the STP cabling, a retry test sequence is initiated by the adaptive interface and the start up sequence is repeated. If retry is not needed, a transmit error is displayed and the Ethernet installation cannot proceed without modification. A diagnostic menu is displayed and a set up process determines with human intervention what system changes are needed for the workstation/Ethernet connection.

DESCRIPTION OF DRAWING

The invention will be further understood from the following detailed description of a preferred embodiment taken in conjunction with an appended drawing, in which.

DESCRIPTION OF PREFERRED EMBODIMENT

Figure 1:
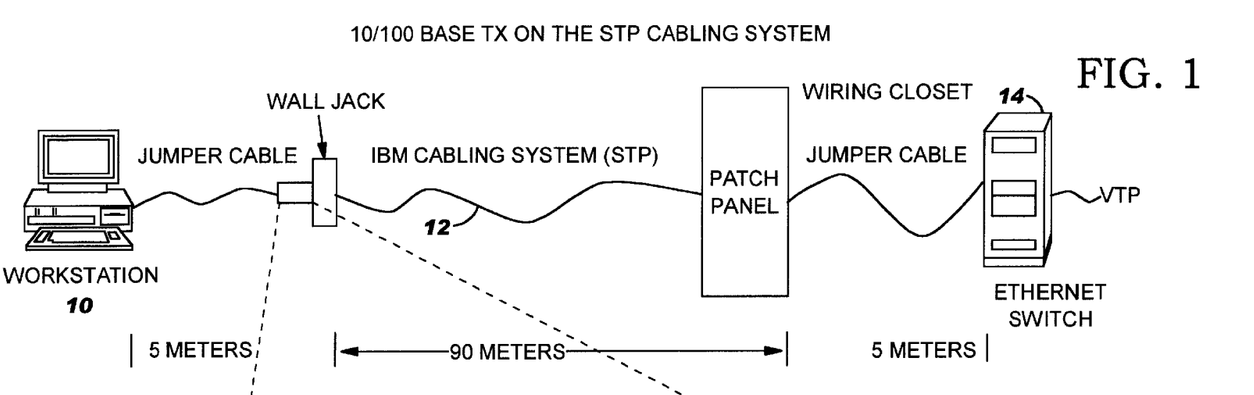
FIG. 1 is a representation of a workstation in a STP cabling system connected to an Ethernet installation through an adaptive interface and incorporating the principles of the present invention.

In FIG. 1 a workstation or data terminal element 10 normally connected to a token ring network (not shown) through a Standard Twisted Pair (STP) cabling system 12 may also be connected through the STP cabling system and a switch 14 to an Ethernet installation (not shown) using Untwisted Pair (UTP) cabling. Normally the workstation 10 is within 5 meters of a standard RJ 45 telephone connector coupling the workstation to the token ring network in accordance with IEEE Standard 802.3, Section 14.5.1.

Likewise, workstations coupled to the Ethernet installation employ a standard RJ 45 telephone connector but the pin out configuration for UTP cabling is different than the pin out configuration for the STP cabling system. Likewise, the characteristic impedance of the STP cabling system, which is 150 ohms, is different than the UTP cabling system, which is 100 ohms. Moreover, Ethernet transceivers have adaptive algorithms designed for equalization and attenuation settings for signal improvement on UTP cabling.

Figure 2:
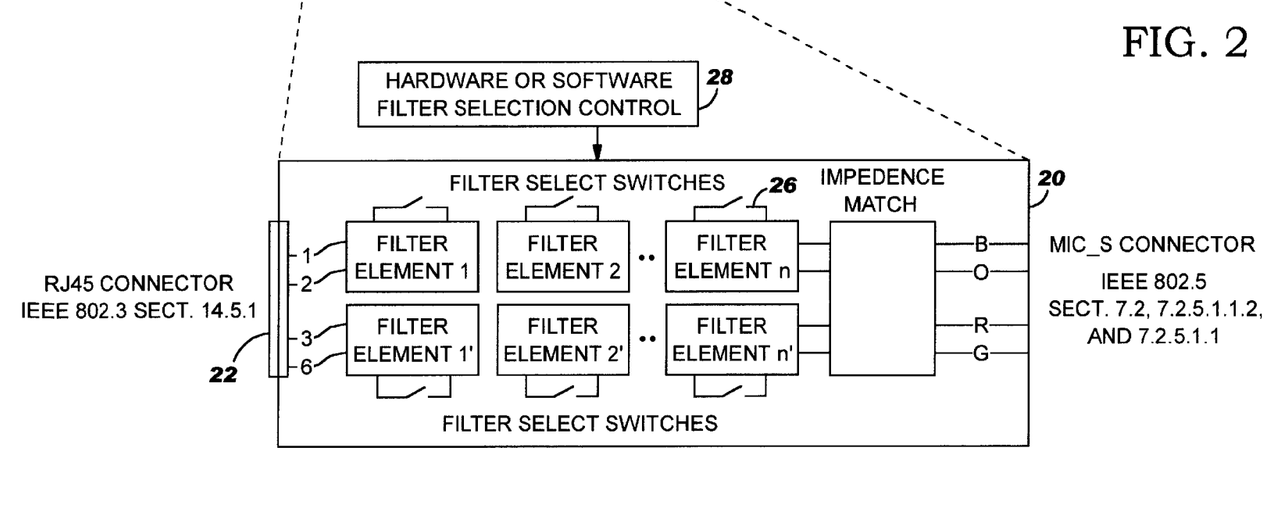
FIG. 2 is a representation of the adaptive interface of FIG. 1.

In FIG. 2, an adaptive interface connector 20 enables the workstation 10 to transmit and receive Ethernet over the STP cabling 12. The connector transitions the RJ 45 connector pin out for STP cabling to the RJ 45 connector pin out for the Ethernet installation. The connector 20 includes an RJ 45 connector 22 having a pin out configuration for STP cabling as described in IEEE Standard 802.3 Section 14.5.1 coupled through filter elements 1, 2, . . . , N and 1', 2', . . . , N' (to be described hereinafter). The adaptive interface provides output terminals B, O, R, and G coupled to an MIC_S which provides a pin out arrangement for the STP cabling system, completing the transition to the pin out configuration consistent with the Ethernet installation. The filter elements are programmatically switchable into the STP cable to change the attenuation and phase of the signals on the STP cabling transmit to represent Ethernet signals on UTP cabling. Each filter element corresponds to a preselected length of UTP cable in terms of attenuation and phase. The filter elements are programmatically cascaded to add the necessary amount of attenuation to the STP channel to look like an equivalent length of UTP cabling.

Figure 3:
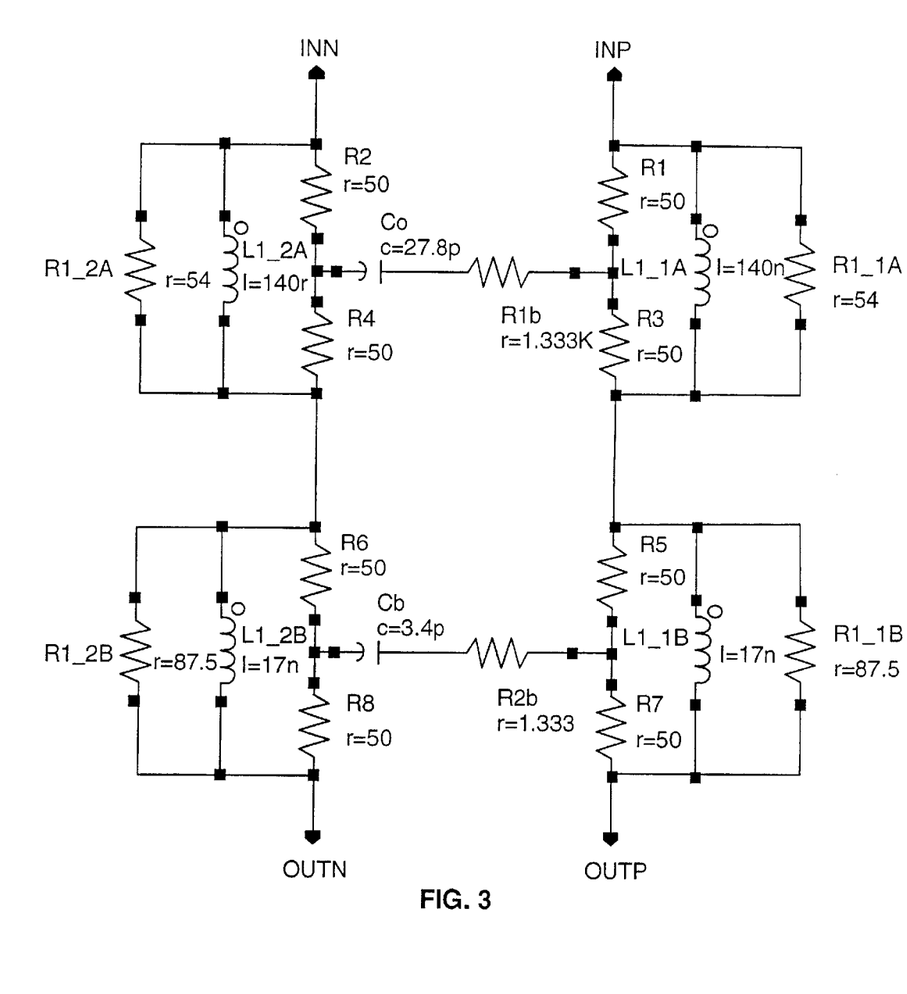
FIG. 3 depicts a filter in the adaptive interface of FIG. 2.

FIG. 3 is one embodiment of a filter section to mirror the performance of a preselected length of UTP cable and provide a predetermined amount of attenuation on the STP cabling. Each filter section comprises input terminals INP and INN for receiving positive and negative signals and providing output signals OUTP and OUTN. Each input terminal is connected to the corresponding output terminal through identical circuits including series resistors R1, 3, 5, 7 for INP/OUTP and R2, 4, 6, 8 for INN/OUTN. Parallel inductor $L_1$ and series resistor R are coupled to each set of series resistors. An RC circuit couples the mid-points of the series resistors between the input and output circuits. The purpose of the filter is to simulate the attenuation characteristics of a predetermined length of CAT5 UTP cable. Early Fast Ethernet PHY implementations optimize their equalization to a fixed length of CAT 5 cable. Due to the superior attenuation characteristics of STP cable, some of these PHY implementations may not operate correctly on short STP links. Through the use of filtering, signal levels presented to the PHY can be brought into a more optimum range.

Figure 5:
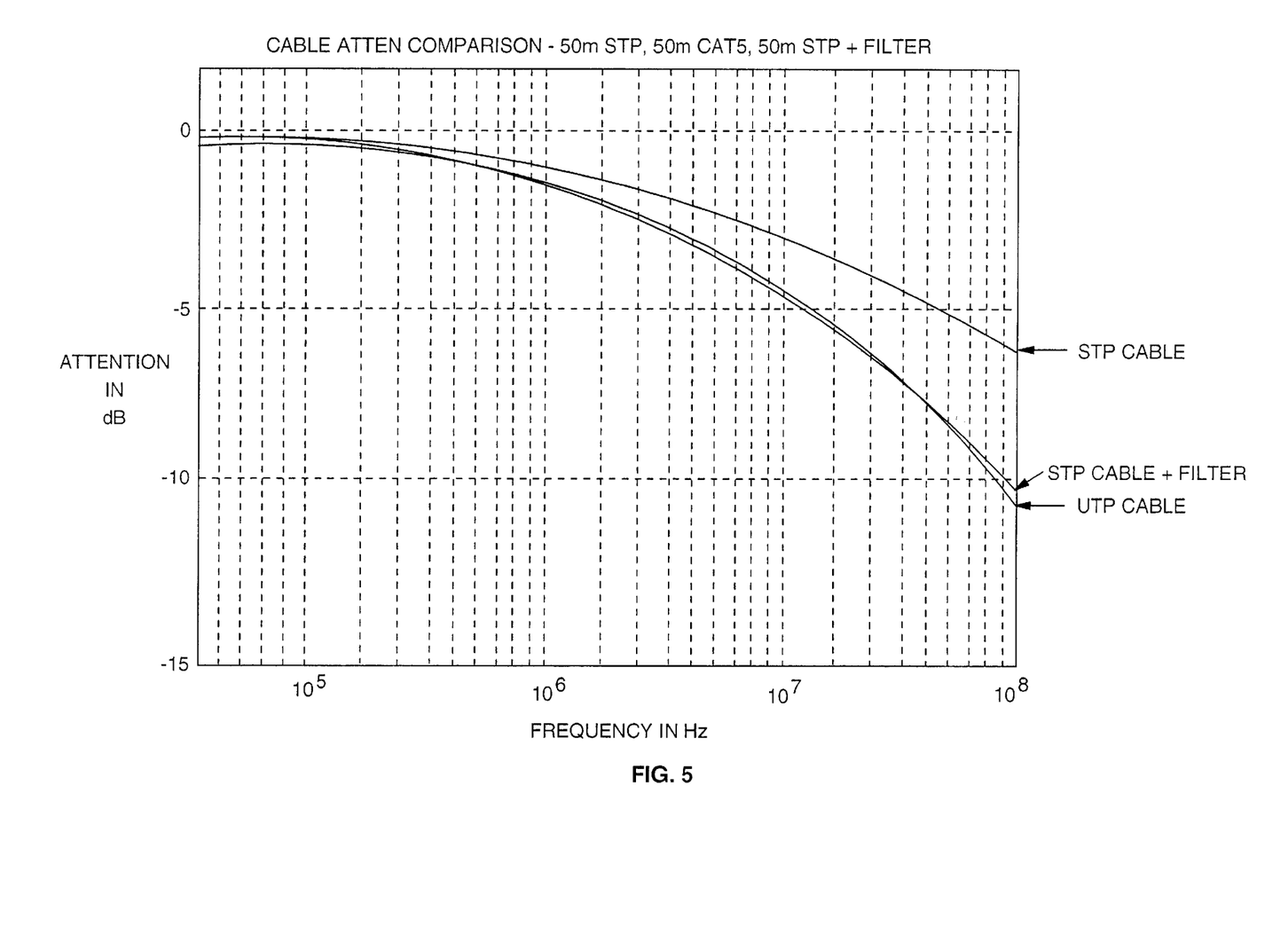
FIG. 5 depicts simulated responses of STP, UTP 5, and composite adaptive interface and STP cabling system.

The filter design can take many forms, and can be implemented as an auxiliary device (as shown), or imbedded into workstation or network equipment. For purposes of illustration, a three-stage filter is shown. Although it is unlikely that the exact filter implementation shown would be chosen, it can be analyzed simply, and serves as an example of this concept. The filter is made up of three constant resistance pole/zero stages. By optimizing the selection of poles and zeros, the filter approximates the attenuation characteristics of 20 meters of CAT 5 cable to within 1 dB, between 50 kHz and 100 MHz. An overlay of cable and filter attenuation is shown in FIG. 5.

The series resistors provide attenuation while the RL circuit provides the zero frequency response. The RC circuit provides a pole in the frequency response. The combination of the series resistor RL and RC circuits over frequency appear as a constant load and can be cascaded without one series one filter loading another filter.

Summarizing, the filter circuits of the adaptive interface connector 20 can be programmatically connected in series to provide an equivalent length of UTP cabling in the STP cabling such that there is sufficient attenuation of the STP signals to appear as Ethernet signals on the UTP cabling. As a result, the algorithms in the Ethernet installation can perform adaptive equalization of the signals on the UTP cabling.

Each filter element includes switches 26, which are programmatically controlled by software 28 to provide the correct length of UTP cabling in the STP cabling. The operation of the software 28 will now be described in conjunction with FIGS. 4A and 4B.

Figure 4:
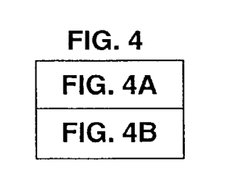
FIGS. 4A and 4B are flow charts for operating the adaptive interface of FIG. 2 in connecting a workstation to an Ethernet installation through an STP cabling system.
Figure 4A:
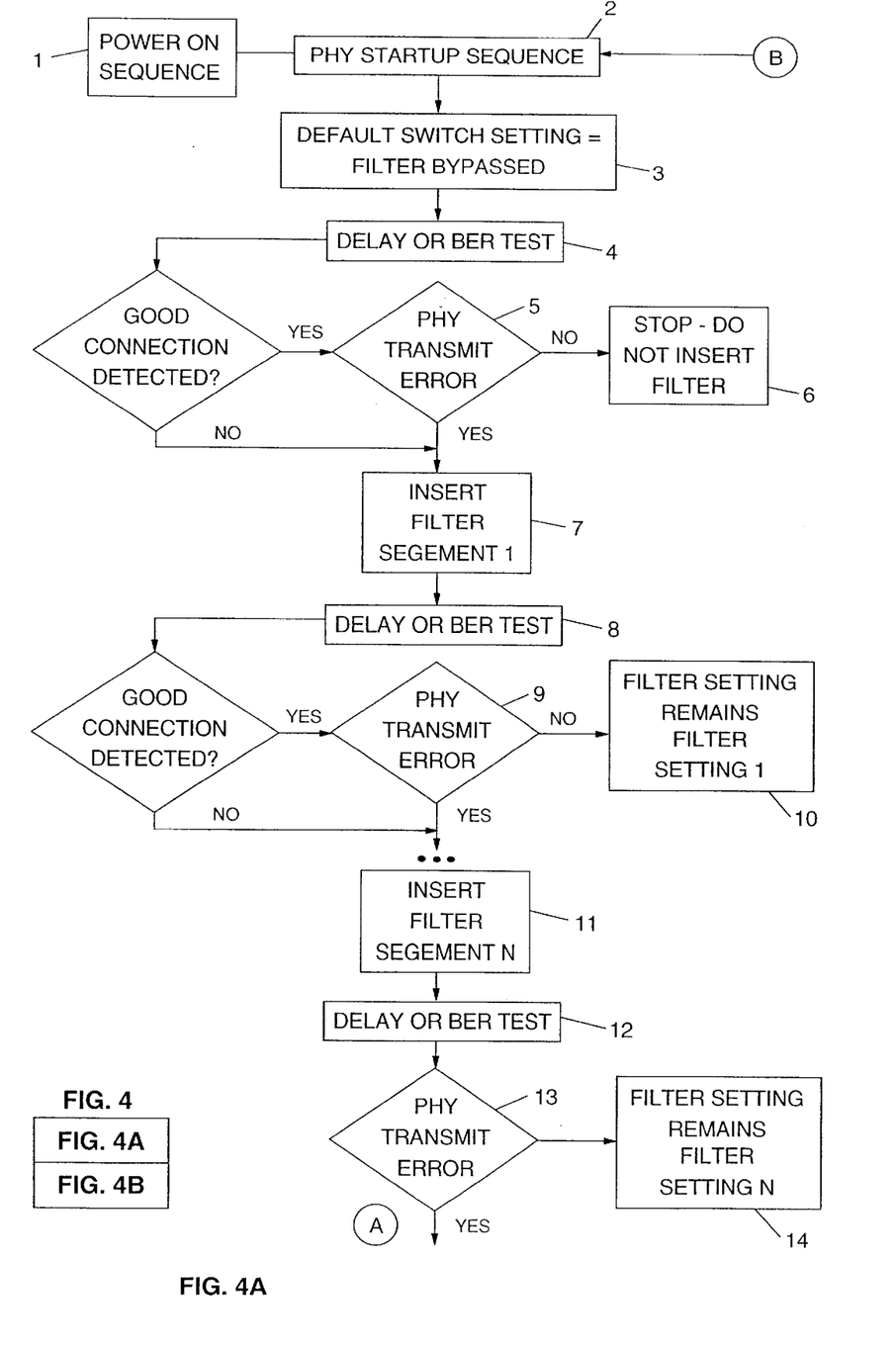
Figure 4B:
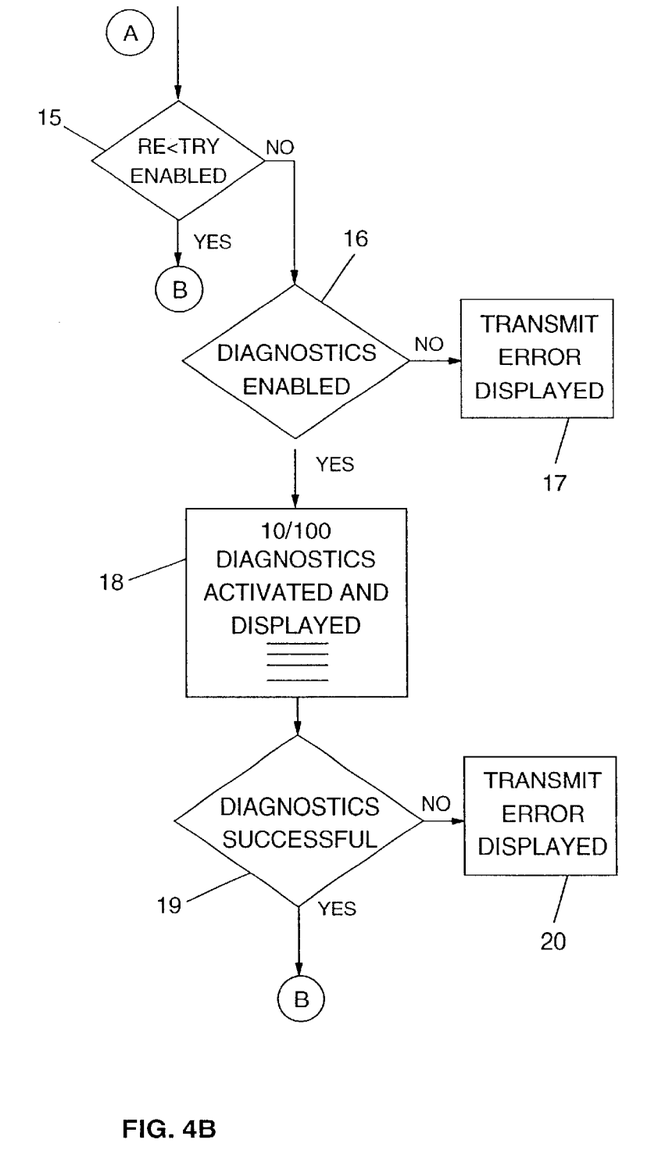

In block 1, the power on sequence of the physical layer is initiated. A startup sequence is initiated in block 2. Initially, in block 3, the switches 26 are in default setting and the filters are bypassed. An operation 4 provides a delay to allow physical layer convergence or a bit error rate measurement. A test 5 is performed to determine whether a good Ethernet connection exists or not. For a "yes" condition, a transmit error test is performed to determine if the workstation is transmitting or receiving Ethernet signals. A "no" condition terminates the program at block 6 and a filter is not inserted into the circuit. A "yes" condition initiates block 7 in which a filter segment 1 is inserted into the circuit. Afterwards, another delay or bit error rate test is performed in block 8 to determine if a good connection exists. A "yes" condition initiates a second transmit error test in block 9. A "no" condition initiates block 10 in which the filter setting remains at the filter setting in block 7. A bad connection or an error condition initiates block 11 in which a second filter section is inserted into the circuit. A delay or bit error rate test is performed in block 12 followed by another a physical transmit or error test in block 13. A "no" condition initiates block 14 in which the filter setting remains at the previous setting. A "yes" condition after all filters have been installed or connected in the circuit, initiates a retry test in block 15. A "yes" condition returns the circuit to block 2 to repeat the startup sequence and successive steps. A "no" condition initiates block 16 in which diagnostics are enabled. A "no" condition initiates block 17 in which transmit error is displayed. A "yes" condition initiates block 18 in which diagnostics are activated and displayed for the UTP cabling.

In block 19, a test determines if the diagnostics were successful. A "no" condition initiates block 20 in which the transmit error is displayed. A "yes" condition returns the circuit to block 2 to repeat the start up sequence and successive steps.

In FIG. 5, the cable attenuation comparison is given for 50 meters of STP cabling; 50 meters of UTP cable; and 50 meters of STP cable plus the filter of the present invention. The comparison plots attenuation in dB vs. +Frequency in Hertz. FIG. 5 shows that the STP cabling has less attenuation per frequency than the UTP cabling. The STP cabling with filter substantially matches the frequency response of the UTP cabling. As filter sections are incorporated into the STP cabling, the attenuation is increased by a pre-determined amount, and the combination of filter sections provide the attenuation, which matches the UTP cabling.

Summarizing, the present invention provides an adaptive interface apparatus, which enables a workstation to transmit and receive Ethernet over STP cabling. The apparatus adaptively inserts filters into the STP cabling to emulate a given number of meters of UTP 5 cabling for those Ethernet transceivers, which optimize around that design point. A program tests the STP cabling by bit error rate measurement and switches in the filter sections as necessary to eliminate any bit errors. If bit errors still exist after all filter elements have been connected to the STP cabling, diagnostics are enabled to indicate the error or return to the STP cabling for further testing after the bit error is corrected.

While the invention has been shown and described in conjunction with a specific embodiment, various changes can be made without departing from the spirit and scope of the invention as defined in the appended claims, in which:

We claim:

1. A controllable interface adapter for transmitting and receiving Ethernet over a first cable system, comprising:
   i) an Ethernet installation having first characteristic impedance and a first connector pin configuration;
   ii) the first cable system having second characteristic impedance and a second connector pin configuration;
   iii) means for transforming the second connector pin configuration to the first connector pin configuration;
   iv) means for transforming the second characteristic impedance to the first characteristic impedance; and
   v) controllable means for emulating amplitude attenuation and phase effects in the first cable system to match that of the Ethernet installation.

2. The controllable interface adapter of claim 1 wherein the controllable means comprises:
   vi) a first connector adapted to connect a workstation to the first cable system;
   vii) a second connector adapted to connect to the Ethernet installation through the first cable system; and
   viii) switchable filter elements connected between the first and the second connectors.

3. The controllable interface adapter of claim 2 further comprising:
   ix) means for switching the filter units to control amplitude attenuation and phase shift on the first cable system to match the Ethernet installation.

4. The controllable interface adapter of claim 1 wherein the first cable system further comprises:
   means for emulating a preselected length of a second cable system having a third characteristic impedance.

5. The adapter of claim 1 wherein the first cable system is a shielded twisted pair cable system.

6. The adapter of claim 5 wherein the second cable system is an unshielded twisted pair cable system.

7. The adapter of claim 2 further comprising:
   means for successively connecting the filter elements to control amplitude and phase shift in the first cable system to match the Ethernet installation.

8. The adapter of claim 7 wherein the means for successively connecting is software.

9. The adapter of claim 7 wherein the means for successively connecting is hardware.

10. The adapter of claim 1 further comprising:
    means for modifying the attenuation and phase shift of signals on the first cable system for application of equalization algorithms on the Ethernet installation.

11. In a communication system using Open System Interface (OSI) architecture including a controllable interface adapter for coupling a first cabling system to an Ethernet installation, a method facilitating connection of a work station in a Local Area Network (LAN) to the Ethernet installation, comprising the steps of:
    i) installing a first connector and a second connector in the adapter;

ii) installing a filter element having a plurality of sections 1 . . . N in the adapter and connecting the element to the first and second connectors;
iii) initiating a start up sequence for a Physical Layer (PHY) in the communication system;
iv) examining transmit/receive signals in the PHY for bit errors in the following steps:
   a) if no bit errors are present, coupling the workstation to the Ethernet installation through the adapter with the filter bypassed;
   b) if bit errors are present, coupling the workstation to the Ethernet installation through the adapter with at least one filter section in the first cable system;
   c) repeating steps (iv), (iva) and (ivb) until the Nth section is connected in the first cable system and performing the following steps if bit errors are present:
      aa) repeating steps (iii) through (ivb);
      bb) transmitting an error message if bit errors are still present in (ivb) and
      denying connection of the workstation to the Ethernet installation.

12. The method of claim 11 further comprising the step of:
cc) enabling diagnostics and determining the changes in the adapter to enable connection of the workstation to the Ethernet installation.

13. The method of claim 11 further comprising the step of:
dd) programmatically combining filter elements to translate signals on the first cable system to Ethernet signals.

14. The method of claim 11 further comprising the step of:
ee) switching the filter element to add a filter sections to the first cable system.

15. The method of claim 11 further comprising the step of:
ff) altering connector pins in the second connector to match connector pins in the Ethernet installation.

16. The method of claim 11 wherein the first cable system is a shielded twisted pair.

17. The method of claim 11 wherein the Ethernet installation is an unshielded twisted pair.

* * * * *